United States Patent
Soles et al.

(10) Patent No.: US 11,955,620 B1
(45) Date of Patent: Apr. 9, 2024

(54) HYBRID HYDROGEN POWER MODULE

(71) Applicant: First Mode IPP Limited, London (GB)

(72) Inventors: Julian Jeremy Soles, London (GB); Christopher Jason Voorhees, London (GB)

(73) Assignee: First Mode IPP Limited, London (GB)

( * ) Notice: Subject to any disclaimer, the term of this patent is extended or adjusted under 35 U.S.C. 154(b) by 0 days.

(21) Appl. No.: 18/545,766

(22) Filed: Dec. 19, 2023

Related U.S. Application Data

(63) Continuation of application No. 17/425,694, filed as application No. PCT/EP2020/077348 on Sep. 30, 2020, now Pat. No. 11,894,539.

(30) Foreign Application Priority Data

Oct. 4, 2019 (GB) ..................................... 1914406

(51) Int. Cl.
*H01M 16/00* (2006.01)
*B60L 50/75* (2019.01)
(Continued)

(52) U.S. Cl.
CPC ........... *H01M 16/006* (2013.01); *B60L 50/75* (2019.02); *B60L 53/22* (2019.02); *B60L 58/26* (2019.02);
(Continued)

(58) Field of Classification Search
CPC ............. H01M 10/613; H01M 10/625; H01M 10/663; H01M 2220/20; H01M 2250/20;
(Continued)

(56) References Cited

U.S. PATENT DOCUMENTS

| | | | |
|---|---|---|---|
| 2,912,184 A | 11/1959 | Lee | |
| 6,053,266 A | 4/2000 | Greenhill et al. | |

(Continued)

FOREIGN PATENT DOCUMENTS

| | | |
|---|---|---|
| AU | 2020360617 A1 | 7/2021 |
| CN | 105932191 A | 9/2016 |

(Continued)

OTHER PUBLICATIONS

Final Rejection Office Action for U.S. Appl. No. 17/675,303 dated Oct. 28, 2022, 15 pages.

(Continued)

*Primary Examiner* — Adam A Arciero

(57) ABSTRACT

An apparatus for powering trucks including a power module skid and supporting structure for fitting on a truck. The skid housing hydrogen fuel cell modules, battery sub packs, cooling means and cooling management, and integrated power electronics, to provide an electrical drive train of the truck with a constant high voltage DC power supply. An integrated system using renewable energy to reduce greenhouse gases using one or more trucks, in which an integrated system includes: means for providing renewable energy; means for using the renewable energy to synthesise hydrogen; means for storing the synthesised hydrogen. The integrated system includes hybrid hydrogen power modules fitted to each truck including hydrogen fuel cell modules and battery sub packs so that the battery sub packs and the battery sub packs are recharged by the hydrogen fuel cells.

30 Claims, 4 Drawing Sheets

(51) Int. Cl.
  *B60L 53/22* (2019.01)
  *B60L 58/26* (2019.01)
  *B60L 58/33* (2019.01)
  *B60L 58/40* (2019.01)
  *H01M 8/04029* (2016.01)
  *H01M 8/0656* (2016.01)
  *H01M 10/613* (2014.01)
  *H01M 10/625* (2014.01)
  *H01M 10/663* (2014.01)

(52) U.S. Cl.
  CPC ............ *B60L 58/33* (2019.02); *B60L 58/40* (2019.02); *H01M 8/04029* (2013.01); *H01M 8/0656* (2013.01); *H01M 10/613* (2015.04); *H01M 10/625* (2015.04); *H01M 10/663* (2015.04); *B60L 2200/36* (2013.01); *B60L 2200/44* (2013.01); *B60L 2210/10* (2013.01); *B60L 2210/14* (2013.01); *H01M 2220/20* (2013.01); *H01M 2250/20* (2013.01)

(58) Field of Classification Search
  CPC ...... H01M 16/006; B60L 50/75; B60L 53/22; B60L 58/26; B60L 58/33; B60L 58/40; B60L 2200/36; B60L 2200/44; B60L 2210/10; B60L 2210/14; B60L 2200/40; C25B 1/04; Y02E 60/36; Y02P 20/133; Y02T 90/14; B60Y 2200/142
  See application file for complete search history.

(56) References Cited

U.S. PATENT DOCUMENTS

| | | |
|---|---|---|
| 7,681,676 B2 | 3/2010 | Kydd |
| 7,966,945 B1 | 6/2011 | Miller et al. |
| 8,011,461 B2 | 9/2011 | Rodriguez et al. |
| 8,596,391 B2 | 12/2013 | Kshatriya |
| 8,950,378 B2 | 2/2015 | Holt et al. |
| 9,308,810 B1 | 4/2016 | Kurdy |
| 9,457,792 B2 | 10/2016 | Bradley et al. |
| 11,351,850 B1 | 6/2022 | Calandruccio |
| 2002/0168556 A1 | 11/2002 | Leboe et al. |
| 2003/0207156 A1 | 11/2003 | Ovshinsky et al. |
| 2004/0018399 A1 | 1/2004 | Jung |
| 2004/0110050 A1 | 6/2004 | Abd Elhamid et al. |
| 2004/0129466 A1 | 7/2004 | Leifert |
| 2004/0188154 A1 | 9/2004 | Carlson |
| 2005/0008904 A1 | 1/2005 | Suppes |
| 2005/0044853 A1 | 3/2005 | Yoshino |
| 2005/0100767 A1 | 5/2005 | Stolmar |
| 2006/0000650 A1 | 1/2006 | Hughey |
| 2006/0266255 A1 | 11/2006 | Donnelly et al. |
| 2007/0138006 A1 | 6/2007 | Oakes et al. |
| 2009/0223725 A1 | 9/2009 | Rodriguez et al. |
| 2011/0214930 A1 | 9/2011 | Betts et al. |
| 2013/0065090 A1 | 3/2013 | Kazuno et al. |
| 2015/0298538 A1 | 10/2015 | Janarthanam et al. |
| 2018/0219267 A1 | 8/2018 | Martin et al. |
| 2019/0152309 A1 | 5/2019 | Roper |
| 2019/0160963 A1 | 5/2019 | Yoon et al. |
| 2020/0207377 A1 | 7/2020 | Schuhholz et al. |
| 2020/0249035 A1 | 8/2020 | Gitz |
| 2022/0105791 A1 | 4/2022 | Hendriks et al. |
| 2022/0169129 A1 | 6/2022 | Soles et al. |
| 2022/0173459 A1 | 6/2022 | Soles et al. |
| 2023/0339308 A1 | 10/2023 | Sweere et al. |

FOREIGN PATENT DOCUMENTS

| | | |
|---|---|---|
| CN | 106129298 A | 11/2016 |
| CN | 107161016 A | 9/2017 |
| CN | 110217116 A | 9/2019 |
| CN | 110861481 A | 3/2020 |
| CN | 212219927 U | 12/2020 |
| CN | 214001306 U | 8/2021 |
| EP | 1675200 A2 | 6/2006 |
| EP | 1923288 A2 | 5/2008 |
| EP | 2347926 A1 | 7/2011 |
| EP | 3421279 A1 | 1/2019 |
| GB | 2587666 A | 4/2021 |
| JP | 2005329818 A | 12/2005 |
| JP | 2010211942 A | 9/2010 |
| KR | 20180138001 A | 12/2018 |
| KR | 102353924 B1 | 1/2022 |
| WO | WO-2005063520 A1 | 7/2005 |
| WO | WO-2007050149 A1 | 5/2007 |
| WO | WO-2021064010 A1 | 4/2021 |
| WO | WO-2023164756 A1 | 9/2023 |
| WO | WO-2023212528 A1 | 11/2023 |

OTHER PUBLICATIONS

GB 1914406.2, Search Report dated Apr. 3, 2020, 2 pages—English.
GB 1914406.2, Search Report dated Nov. 30, 2020, 2 pages—English.
GB Office Action for GB Application No. GB1914406.2, dated Apr. 28, 2023, 6 pages.
International Search Report and Written Opinion for PCT Application No. PCT/US2023/066129 dated Aug. 30, 2023, 14 pages.
Non Final Office Action for U.S. Appl. No. 17/675,303, dated Jun. 17, 2022, 11 pages.
Non-Final Office Action for U.S. Appl. No. 18/180,042 dated Sep. 14, 2023, 7 pages.
PCT/EP2020/077348, International Search Report and Written Opinion dated Mar. 25, 2021, 17 pages combined—English.
PCT/EP2020/077348, Invitation to Pay Fees and Invitation relating to Partial International Search dated Jan. 15, 2021, 13 pages—English.
U.S. Office Action for U.S. Appl. No. 18/493,450, dated Jan. 17, 2024, 7 pages.

HYBRID HYDROGEN POWER MODULE

CROSS REFERENCE TO RELATED APPLICATIONS

This application is a continuation of U.S. patent application Ser. No. 17/425,694, filed Jul. 23, 2021, entitled "Hybrid Hydrogen Power Module," which is a National Phase Application under 35 U.S.C. § 371 of International Patent Application No. PCT/EP2020/077348, filed Sep. 30, 2020, entitled "Hybrid Hydrogen Power Module," which claims priority to and the benefit of U.K. Patent Application No. GB 1914406.2, filed Oct. 4, 2019, entitled "Hybrid Hydrogen Power Module," the entire disclosure of each of which is incorporated herein by reference.

TECHNICAL FIELD

The present invention is directed towards the utilisation of energy to help power a truck, in particular for use on a truck in a mining environment. The invention is particularly directed towards the use of fuel cells on trucks to help eliminate greenhouse gas emissions on a site.

BACKGROUND

Existing technology is entirely dependent on traditional fossil fuel sources. Trucks are powered by diesel generators and the diesel is itself generated from the extraction and treatment of traditional fossil fuels. Mining plants are typically powered off the local grid which in most instances is largely or completely resourced by the burning of fossil fuel. There is an industry desire to reduce the dependence on fossil fuels and to provide a cost-effective alternative to diesel which alternative results in no or substantially no reduction in performance of the truck. An object of the present invention is therefore to provide apparatus to power trucks which does not rely on fossil fuels and which can both be retrofitted on to existing trucks in place of existing diesel generators, and can also be used in new purpose-built trucks. It is a further object of the invention to significantly reduce the carbon footprint of a mine and plant and the emission of greenhouse gases from a mine and associated trucks.

SUMMARY

According to the present invention there is provided apparatus for powering trucks, said apparatus including a power module skid and supporting structure for fitting on a truck, said skid housing one or more hydrogen fuel cell modules, one or more battery sub packs, cooling means and cooling management, and integrated power electronics, to provide an electrical drive train of the truck with a constant high voltage DC power supply. By using the hybrid hydrogen power module including the hydrogen fuel cells and the battery sub packs, the trucks have a secure supply of energy throughout the day and night. The battery sub packs preferably recharge during regenerative braking of the trucks and also by drawing energy from the hydrogen fuel cells. Accordingly, there is no need to stop the trucks to recharge the batteries during the working day, or to remove the batteries for charging and replacing them with charged batteries. Both of these options are time consuming and result in the truck being out of use for significant proportions of time.

The apparatus of the present invention is particularly effective when used on ultra heavy-duty trucks which may be used in a mine environment. These may be trucks which are over 100 tonnes, for example, or over 200 or 300 tonnes. Such ultra heavy-duty trucks require a considerable power input and are traditionally powered by heavy duty diesel generators. It they were to try to operate using batteries alone, they would require several batteries and such a set up would result in a reduction in the performance of the truck when compared to traditional diesel trucks, due in part to the weight of the batteries. The use of a hybrid system allows a significant reduction in the number of battery sub packs required and also provides a boost in power such that the performance can match or even exceed that of a traditional diesel driven truck, and at a similar weight.

The skid may house any number of hydrogen fuel cell modules and any number of battery sub packs. This may vary depending on the environment in which the truck is being used and taking into account variables such as the nature of the terrain, the changes in elevation that the truck would have to travel, the overall distances travelled on a round trip, the ratio between travel uphill, downhill and on the flat, the nature and weight of the truck load, whether load is carried uphill, downhill or both and the climate (including, for example, the ambient temperature, humidity, wind speed, pressure). The flexibility of the apparatus of the present invention is important, so that optimal operation of the trucks can be achieved. In some embodiments, different skids having different combinations of hydrogen fuel cells and battery sub packs will be available and can be changed on trucks to take into account changes in operating conditions over time. In other embodiments, the configuration of a skid may be changed over time to increase or reduce the number of hydrogen fuel cells and/or battery sub packs, again to adapt to changes in the operating conditions.

In an embodiment of the invention, there are equal numbers of hydrogen fuel cells and battery sub packs so that there is a 1:1 relationship between them. In other embodiments there are more hydrogen fuel cells than battery sub packs, for example in the range 10:1 to 2:1. In other alternative embodiments, there are fewer hydrogen fuel cells than battery sub packs, for example in the range 1:2 to 1:10.

In an embodiment the cooling is provided, at least in part, by means of a multi-zone radiator with integrated fans and coolant fluid loops. The cooling management ensures that the components are all efficiently and effectively cooled to maintain their temperatures within the operating range and such that the coolant is used as efficiently as it can be in the system.

The apparatus of the present invention may produce a power output in excess of 0.5 MW, for example greater than 1 MW such as in the range 1 to 3 MW or 1.25 to 2.75 MW. The energy storage capacity of the apparatus may be in excess of 1 MWh, for example in the range 1 MWh to 5 MWh.

The present invention also provides a method for powering trucks in a mine environment, in which a truck is provided with one or more hydrogen fuel cell modules and one or more battery sub packs and in which hydrogen is loaded on to the trucks and is used to generate power in the hydrogen fuel cells, said power being used both to run the truck operations and also to recharge the battery sub packs.

The number of fuel cell modules and the number of battery sub-packs may be varied to control the overall battery energy storage capacity and therefore the power output as described above. The fuel cell modules may be arranged in parallel and be used simultaneously to provide power to a single DC link voltage which provides the power to the drive train of the truck.

Additionally, there may be a DC/DC converter between each of the hydrogen fuel cell modules to boost the module's output voltage and to compensate for phases and output differences between the modules, to thereby enable a shared output to be regulated to provide a steady and consistent high voltage output. This configuration may provide substantial flexibility in the system and allow the power output to be controlled such that it is a steady and consistent high voltage output that may be regulated around voltage, current and/or power depending on the requirements of the truck and the environment in which it is being used.

In an embodiment of the method, the battery sub packs recharge during operation by taking energy both from regenerative braking of the truck and from the hydrogen fuel cell.

The present invention also extends to an integrated system for using renewable energy in a mine environment to reduce the emission of greenhouse gases, in which environment, mined material is transported around the mine using one or more trucks, in which integrated system there are: means for providing renewable energy; means for using the renewable energy to synthesise hydrogen; means for storing the synthesised hydrogen; wherein, the integrated system further includes hybrid hydrogen power modules fitted to each truck, said power modules including hydrogen fuel cell modules and battery sub packs, whereby the stored hydrogen is loaded on to the truck to feed the hydrogen fuel cell modules so that the truck is entirely powered by the combination of the hydrogen fuel cells and the battery sub packs and the battery sub packs are recharged by the hydrogen fuel cells during use such that they do not need to be removed or remotely charged.

Such a hybrid energy system also provides a steady and consistent power supply for use in the trucks throughout the day and night. Use of renewable energy gives the user an independence from and resilience to fluctuations in energy prices which are dominated by the price of fossil fuels. The system also offers significant reductions in greenhouse gas emissions which helps to provide an environmental benefit to local communities (such as noise reduction and air quality improvements). It can also contribute towards a significant reduction in the carbon footprint of the mine operator.

The source of renewable energy may be 100% renewable energy from a local grid system in locations where this is available. Alternatively, it may be local capture of renewable energy such as solar, wind, hydroelectric, geothermal or nuclear using any appropriate apparatus. This could, for example, be the use of photovoltaic cells to capture solar energy. In another embodiment, the invention could be put into effect using energy from a local grid system which is not obtained entirely from renewable sources but is, for example, predominantly from renewable sources such as at least 60%, or 70% or 80% or 90%.

The mine environment may also include a plant where the mined material is processed, and the capture of renewable energy is in excess of the demands of the plant and the excess energy is used to generate hydrogen which is then used in the powering of the trucks. The trucks may be fitted to include the following components: hydrogen storage tanks, battery packs, hydrogen fuel cell converters, fuel cell boosters, cooling apparatus, and control systems.

The apparatus is optionally arranged to fit on a skid which can be retrofitted to existing trucks in place of the existing diesel power units. This allows the technology to be easily fitted to existing trucks by removing the skid with the diesel generator on it and replacing it with the new hybrid skid.

The hydrogen may be synthesised by means of any suitable green hydrogen or carbon free process such as by the electrolysis of water.

The invention also extends to a method for reducing the carbon footprint of a mining environment, in which the mining environment comprises a plant and a mine in which material is transported between the mine and the plant by means of one or more trucks, which method comprises: providing locally generated renewable energy; using the renewable energy to synthesise hydrogen; storing the hydrogen; operating the trucks by means of a hybrid hydrogen power module which includes hydrogen fuel cell modules and battery sub packs; in which the stored hydrogen is loaded on to the trucks and is used to generate power in the hydrogen fuel cells, said power being used to run the truck operations and also to recharge the battery sub packs.

The hydrogen is preferably produced by utilising locally produced renewable energy. This can either be green energy taken from an existing grid, or could alternatively be through the capture of renewable energy from a source of renewable energy such as solar, wind, hydroelectric, geothermal or nuclear. This renewable energy can be used to generate hydrogen by splitting water using the process of electrolysis, as is known in the art. While it is recognised that this method of production may not be the most efficient way to generate hydrogen, if it is done using renewable energy then the effect on the overall carbon footprint of the operation is zero. The hydrogen produced this way would have a zero-carbon footprint as would the trucks then using this hydrogen (instead of diesel) to power the truck.

Optional and preferred features from one aspect of the invention may equally apply to other aspects. Further benefits and advantages of the present invention will become apparent from the following description of embodiments exemplifying the invention.

DETAILED DESCRIPTION

Figure 1:
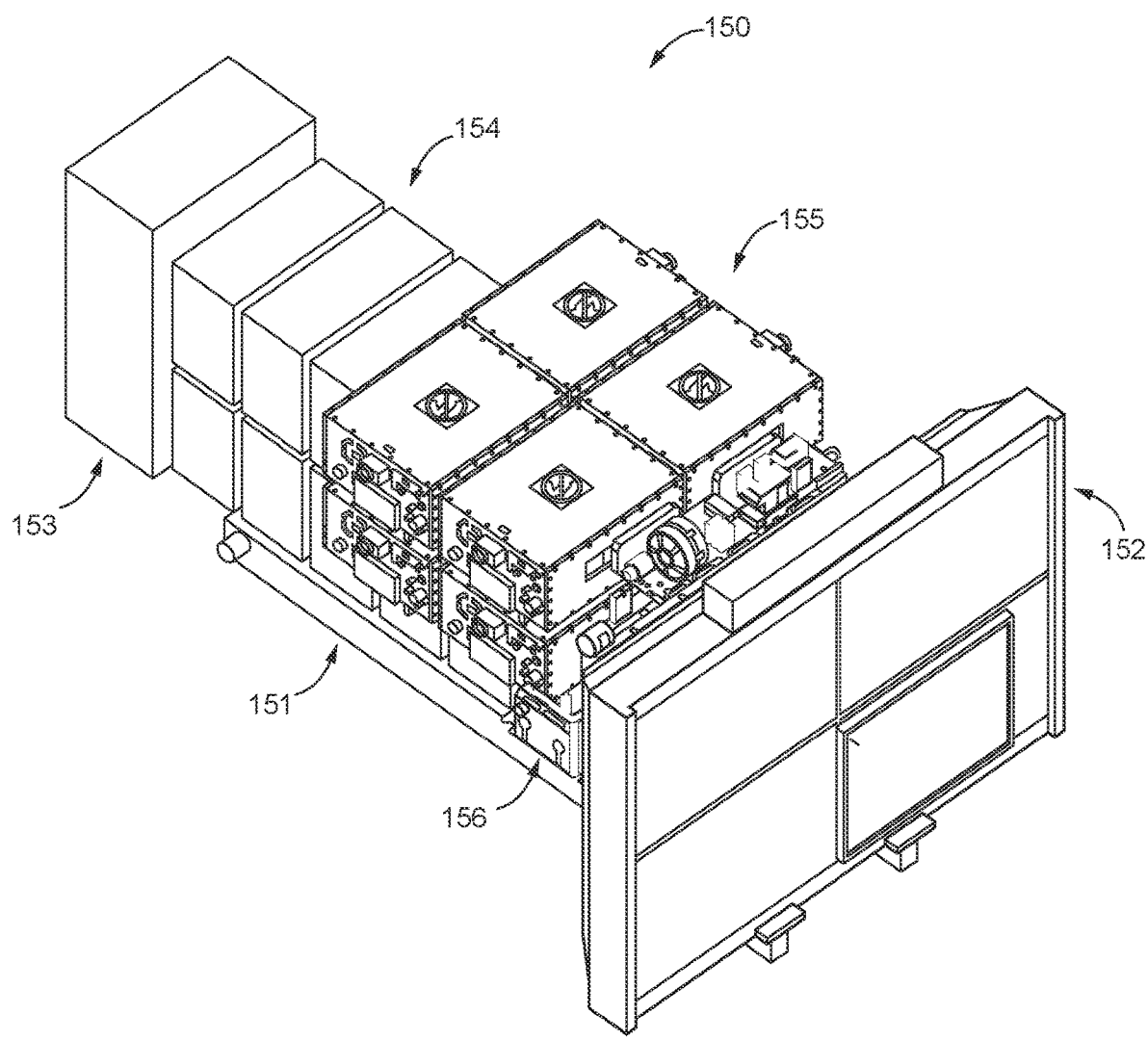
FIG. 1 is a schematic illustration of a configuration of a power module skid according to an embodiment of the present invention.

Referring to FIG. 1, there is shown the integrated configuration of components on a skid 151 according to an embodiment of a hybrid hydrogen power module 150 according to the present invention. This skid module 151 can be readily fitted in to an existing truck in place of the diesel generator currently used. It could also be used on a new truck, constructed specifically to utilize the hybrid system. The module 150 consists of six major subsystem elements. Firstly, there is a power module skid 151 and supporting structure for carrying the components and enabling them to be configured for operation once the skid 151 has been fitted to the truck. Each skid 151 in this embodiment includes eight hydrogen fuel cell modules 155 located in the middle of the skid 151. These are fed by hydrogen from hydrogen storage tanks (not shown) which may be located at suitable locations on the truck. The position of these may vary depending the on the equipment attached to the truck and the environment and terrain in which the truck is operating. Each fuel cell 155 will be fed from one or more hydrogen storage tank, preferably by several tanks so that operation of the fuel cell 155 is not interrupted as a storage tank empties.

The skid 151 also includes a fuel cell coolant management system 156. This may be arranged to be adjacent to the fuel cells 155, for example towards the front of the skid 151. By locating the coolant management system 156 close to the fuel cell modules 155, there is minimum additional tubing and wiring and the cells 155 can be maintained in their optimum operating window. The use of a fluid loop necessitates intimate contact between the heat source and the fluid line and therefore the fluid lines must be integrated into the system design to provide effective heat dissipation and management.

In the embodiment shown, the skid 151 holds eight battery sub-packs 154 such that there is one battery sub-pack 154 for each hydrogen fuel cell module 155. The fuel cells 155 operate in parallel and can therefore all be used to charge the batteries 154. The battery subpacks 154 all work together and can be considered to serve as one large effective battery pack. The batteries 154 are the heaviest components on the skid 151 and therefore, for best balance, they are located at the bottom of the skid 151 and some may be positioned under the fuel cell modules 155.

The components on the skid 151 are controlled by integrated power electronics which in the present example are located in a cabinet 153 towards the rear of the skid 151. These are out of the way of the fuel cells 155 and can be positioned in any suitable location.

At the front of the skid 151 is a power module radiator 152. This integrated multi-zone thermal radiator 152 more efficiently manages the varying thermal needs of the power module components by providing a high local and well-connected thermal sink. This increases the efficiency of the cooling of the components on the skid 151.

The skid 151 may additionally include one or more fuel cell boost convertors (not shown) between the fuel cell modules 155 and the battery sub packs 154. If present, there is preferably one fuel cell boost convertor for each fuel cell 155. Such components help the power module 150 have a high level of flexibility of components, as illustrated in FIG. 2.

Figure 2:
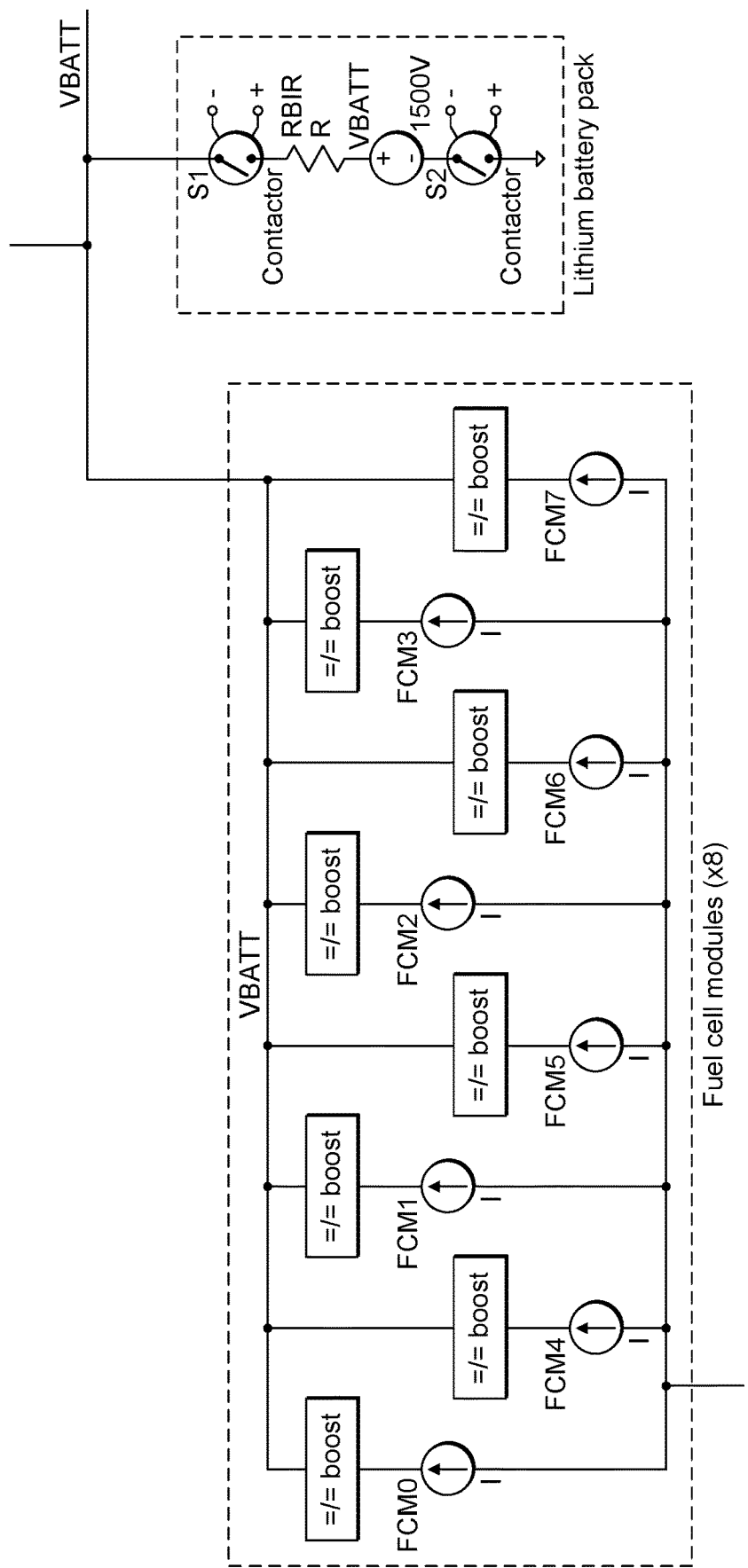
FIG. 2 is an electrical schematic of the power module of an embodiment of the present invention.

As shown in FIG. 2, the hybrid power module 150 of the present invention has a significant flexibility of its configuration to reflect the overall "balance of plant"; that is, the architecture of components on the skid 151 is very flexible to enable changes in the number of fuel cell modules 155 and number of battery sub-packs 154 to be made and therefore adjust the overall battery energy storage capacity. The overall architecture enables multiple independent fuel cell modules 155 to be simultaneously used to provide power to the same DC link voltage (labeled VBATT in FIG. 2) to which the power module battery 154 provides power.

The system utilizes an individual DC/DC converter between each of the fuel cell modules 155. While this converter boosts the module's output voltage, it also allows compensation for phase and output differences, enabling multiple fuel cell modules 155 to reside in parallel, each providing DC-link power capacity. The result is a shared output that can be regulated around voltage, current, and/or power requirements to meet the needs of the system. For example, it can provide a steady and consistent high voltage output between 400 and 1500 V, such as between 800 and 1500 V or 1200 and 1500 V and a total power output of greater than 1 MW, for example 2, 2.5 or 3 MW. This is the type of voltage and power output that is consistent with a large industrial application like a heavy-duty haul truck. By contrast, a single state of the art fuel cell module typically operates at less than 400 V with an output in the region of 100 kW. This alone would be too low to support a heavy-duty haul truck application. It is only through a configuration like that shown in FIG. 2 and described above that this type of power and voltage output is achievable.

The power module 150 of FIG. 1 replaces the haul truck's conventional diesel generator and provides the electrical drivetrain with a constant high-voltage DC power supply to facilitate the truck's drive, dump, and auxiliary support functions. The power module 150 resides within the volumetric and configurational constraints of the diesel generator that it replaces within the haul truck system. In addition, the power module 150 structurally interfaces with the truck using the same skid configuration as the diesel generator, allowing the new power module 150 to assemble, integrate, and attach to the truck in a manner similar to the diesel generator.

The integrated power module configuration is one of the preferred embodiments of the present invention because it integrates all of the power generation and power management functions into a single system package, allowing the system to be fully characterized and commissioned without the need of the larger haul truck system. It also minimizes resistive power line losses from high-power harnesses in comparison to other distributed configurations, which would all require longer cable harness lengths resulting in decreased system efficiency. Further, the integrated multi-zone thermal radiator 152 more efficiently manages the varying thermal needs of the power module components by providing a high local and well-connected thermal sink. Further, it utilizes existing primary structural interface and installation aids, requiring no new structural or configurational changes to the haul truck to enable module integration. This is an important aspect so that the truck systems can operate efficiently using the new power source 150 without a substantial reconfiguration of the components on the truck.

Figure 3:
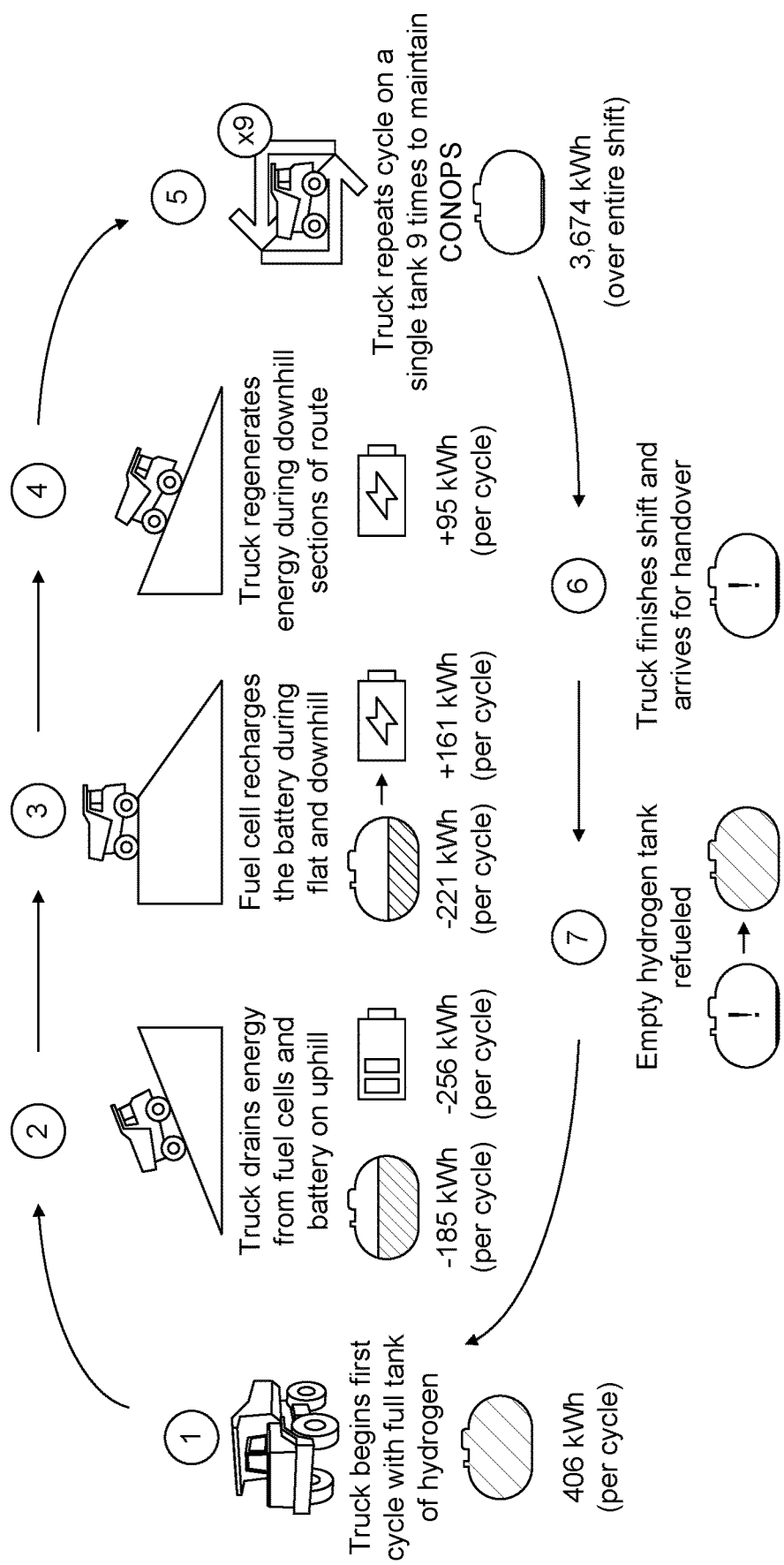
FIG. 3 is schematic of the present invention being used on a truck in a mine environment.

FIG. 3 shows in schematic form, the operation of a truck fitted with the power module 150 of the present invention. The numbers shown for the energy balances between the fuel cells 155 and the batteries 154 are for example only and are not intended to be limiting. Each truck begins at position 1 with full tank of hydrogen. It will be appreciated that the tank of hydrogen may comprise several hydrogen storage tanks which, combined, constitute the hydrogen load of the truck. When the truck drives uphill (position 2) it will drain energy from both the fuel cell 155 and the battery 154. When the truck reaches a flat section (position 3) the fuel cell 155 recharges the battery 154 while also powering the truck. The fuel cell 155 is therefore still using up energy, but some of the energy of the battery 154 used in the uphill section is restored. On a downhill section (position 4), no energy is drawn from the fuel cell 155 and the battery 154 recharges further through the regeneration of energy via the braking system of the truck and the conversion of kinetic energy into stored electrical energy in the battery 154.

This cycle (positions 2, 3 and 4) can be repeated several times depending on the size and capacity of the hydrogen tank or tanks, and the environment in which the truck is being used and the relative amount of uphill, flat and downhill travel. In the example of possible operation and the cycling of energy from the hydrogen tanks to the battery 154 shown in FIG. 3, the battery 154 is always fully recharged in each cycle by the combination of energy from the hydrogen fuel cell 155 and regenerative energy from downhill sections. The cycle can be repeated 9 times before the hydrogen tank is emptied (position 6) and has to be refueled (position 7). Typically, this refueling may take 15 minutes or less which is significantly quicker than the time it would take to remove and replace empty batteries 154 (which are heavy), or the time it would take to recharge the batteries 154 while still retained on the truck (may often require several hours to fully recharge the batteries 154 once they are drained).

Figure 4:
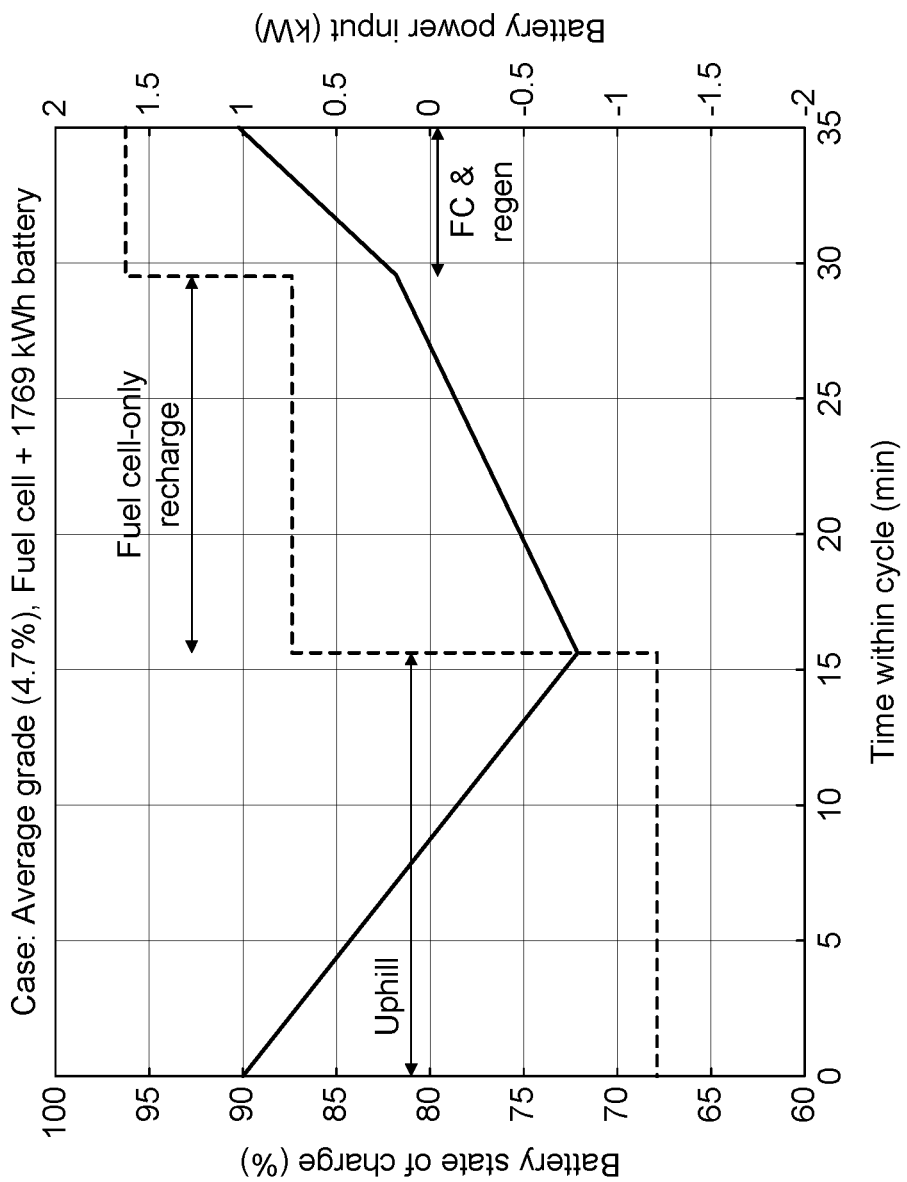
FIG. 4 shows a graphical representation of the shift in energy for one cycle of the operation of the truck shown schematically in FIG. 3.

A graph of the possible use and transfer of energy between the battery 154 and fuel cell 155 in a hybrid system is shown in FIG. 4. As discussed above, on an uphill section, the battery is drained of energy, but this is then replaced when the truck is moving in a flat section where the fuel cell 155 is used to recharge the battery 154 and when the truck is moving in the downhill sections where both recharging by the fuel cell 155 and regenerative charging take place.

In mine environments comprising mines and plants, there is an opportunity to significantly reduce the carbon footprint of the operation while at the same time improving operation of the plant. Currently, the operation of the plant will be powered exclusively by electricity from the local grid. Generally, this electricity will have been obtained from fossil fuels and their treatment at a power plant. Grid systems can be expensive and unreliable as the energy provided can be significantly affected by other users in the grid. Trucks are also powered by fossil fuel derived energy, in most cases by the use of diesel in a diesel generator.

In the present invention, there may be a substantial improvement to the carbon footprint through the use of solar energy to provide power for the plant. This may provide some or all of the power requirements for the plant, and may be topped up as necessary from the grid. The reduces the reliance on the grid and increases security of supply and also decreases the carbon footprint of the plant. Excess solar energy (beyond that used by the plant) is used to produce hydrogen, for example through electrolysis, and this hydrogen is then used in the hybrid system on the trucks as described above. This use of hydrogen in hydrogen fuel cells avoids the need for any diesel on the trucks leading to a significant reduction in greenhouse gas emissions.

The invention claimed is:

1. A method for retrofitting a power module into an ultra heavy-duty truck, the power module including a plurality of hydrogen fuel cell modules, a plurality of battery sub packs, and power electronics that are electrically coupled to each of the plurality of hydrogen fuel cell modules and the plurality of battery sub packs, the method comprising:
   electrically disconnecting a diesel generator from an electrical drive train of the ultra heavy-duty truck;
   physically removing the diesel generator from a structural interface after electrically disconnecting the diesel generator;
   physically coupling the power module to the structural interface of the ultra heavy-duty truck such that the power module resides within volumetric and configurational constraints of the diesel generator; and
   electrically coupling the power electronics to the electrical drive train of the ultra heavy-duty truck.

2. The method of claim 1, wherein the power electronics are configured to provide the electrical drive train a constant, high voltage DC electrical output with a power of at least 0.5 MW and a voltage between 400 V and 1500 V.

3. The method of claim 2, wherein the power electronics includes an individual DC/DC converter coupled to an output of each hydrogen fuel cell module allowing a shared output to be regulated such that the power electronics provide the constant, high voltage DC electrical output.

4. The method of claim 2, wherein the electrical output has a power of at least 1 MW.

5. The method of claim 2, wherein an energy storage capacity of the power module is at least 1 MWh.

6. The method of claim 1, wherein the hydrogen fuel cell modules are electrically coupled in parallel such that the power electronics provide an electrical output to a single DC link voltage.

7. The method of claim 1, wherein the power module further includes a cooling system configured to cool the plurality of hydrogen fuel cell modules and the plurality of battery sub packs.

8. The method of claim 7, wherein the cooling system includes a multi-zone radiator with integrated fans and coolant fluid loops.

9. A method for retrofitting a power module into an ultra heavy-duty truck, the power module including a plurality of hydrogen fuel cell modules, a plurality of battery sub packs, and power electronics that are electrically coupled to each of the plurality of hydrogen fuel cell modules and the plurality of battery sub packs, the method comprising:
   removing a diesel generator from the ultra heavy-duty truck;
   physically coupling the power module to a structural interface of the ultra heavy-duty truck otherwise configured to be physically coupled to the diesel generator; and
   electrically coupling the power electronics to an electrical drive train of the ultra heavy-duty truck otherwise configured to be physically coupled to the diesel generator.

10. The method of claim 9, wherein the removing the diesel generator from the ultra heavy-duty truck includes:
   electrically disconnecting the diesel generator from the electrical drive train of the ultra heavy-duty truck; and
   physically removing the diesel generator from the structural interface after electrically disconnecting the diesel generator.

11. The method of claim 9, wherein the power electronics are configured to provide the electrical drive train a constant, high voltage DC electrical output with a power of at least 0.5 MW and a voltage between 400 V and 1500 V.

12. The method of claim 11, wherein the electrical output has a power of at least 1 MW.

13. The method of claim 11, wherein an energy storage capacity of the power module is at least 1 MWh.

14. The method of claim 9, wherein the hydrogen fuel cell modules are electrically coupled in parallel such that the power electronics provide an electrical output to a single DC link voltage.

15. The method of claim 9, wherein the power module further includes a cooling system configured to cool the plurality of hydrogen fuel cell modules and the plurality of battery sub packs.

16. The method of claim 15, wherein the cooling system includes a multi-zone radiator with integrated fans and coolant fluid loops.

17. A method for retrofitting a power module into an ultra heavy-duty truck in place of a diesel generator removed therefrom, the method comprising:
   disposing the power module in a portion of the ultra heavy-duty truck having constraints associated with the diesel generator, the power module having a plurality of hydrogen fuel cell modules, a plurality of battery sub packs, and power electronics electrically coupled to each of the plurality of hydrogen fuel cell modules and the plurality of battery sub packs;

physically coupling the power module to a structural interface of the ultra heavy-duty truck otherwise configured to be physically coupled to the diesel generator; and electrically coupling the power electronics to an electrical drive train of the ultra heavy-duty truck otherwise configured to be electrically coupled to the diesel generator.

18. The method of claim 17, further comprising:

prior to disposing the power module in the portion of the ultra heavy-duty truck, electrically disconnecting the diesel generator from the electrical drive train of the ultra heavy-duty truck; and physically removing the diesel generator from the structural interface after electrically disconnecting the diesel generator.

19. The method of claim 17, wherein the power electronics are configured to provide the electrical drive train a constant, high voltage DC electrical output with a power of at least 0.5 MW and a voltage between 400 V and 1500 V.

20. The method of claim 17, wherein the power module has a power of at least 1 MW and an energy storage capacity of at least 1 MWh.

21. The method of claim 17, wherein the hydrogen fuel cell modules are electrically coupled in parallel such that the power electronics provide an electrical output to a single DC link voltage.

22. The method of claim 17, wherein the power module further includes a cooling system configured to cool the plurality of hydrogen fuel cell modules and the plurality of battery sub packs.

23. The method of claim 22, wherein the cooling system includes a multi-zone radiator with integrated fans and coolant fluid loops.

24. A method for retrofitting an ultra heavy-duty truck, the method comprising:

providing a power module that is sized and configured to reside within volumetric and configurational constraints of a diesel generator that has been removed from the ultra heavy-duty truck, the power module having a plurality of hydrogen fuel cell modules, a plurality of battery sub packs, and power electronics electrically coupled to each of the plurality of hydrogen fuel cell modules and the plurality of battery sub packs;

physically coupling the power module to a structural interface of the ultra heavy-duty truck otherwise configured to be physically coupled to the diesel generator; and electrically coupling the power electronics to an electrical drive train of the ultra heavy-duty truck otherwise configured to be electrically coupled to the diesel generator.

25. The method of claim 24, further comprising:

prior to disposing the power module in the portion of the ultra heavy-duty truck, electrically disconnecting the diesel generator from the electrical drive train of the ultra heavy-duty truck; and physically removing the diesel generator from the structural interface after electrically disconnecting the diesel generator.

26. The method of claim 24, wherein the power electronics are configured to provide the electrical drive train a constant, high voltage DC electrical output with a power of at least 0.5 MW and a voltage between 400 V and 1500 V.

27. The method of claim 24, wherein the power module has a power of at least 1 MW and an energy storage capacity of at least 1 MWh.

28. The method of claim 24, wherein the hydrogen fuel cell modules are electrically coupled in parallel such that the power electronics provide an electrical output to a single DC link voltage.

29. The method of claim 24, wherein the power module further includes a cooling system configured to cool the plurality of hydrogen fuel cell modules and the plurality of battery sub packs.

30. The method of claim 29, wherein the cooling system includes a multi-zone radiator with integrated fans and coolant fluid loops.

* * * * *